United States Patent [19]
Baberowski et al.

[11] 3,788,449
[45] Jan. 29, 1974

[54] NOVEL VIBRATORY CONVEYOR

[75] Inventors: Waldemar Baberowski; Karl Spiess, both of Herzogenaurach, Germany

[73] Assignee: Industriewerk-Schaeffler OHG, Herzogenaurach, Germany

[22] Filed: Sept. 20, 1972

[21] Appl. No.: 290,492

[30] Foreign Application Priority Data
Dec. 2, 1971 Germany.................. P 21 59 718.2

[52] U.S. Cl............................ 198/107, 198/220 BC
[51] Int. Cl........................ B65g 27/02, B65g 27/34
[58] Field of Search....................... 198/107, 220 BC

[56] References Cited
FOREIGN PATENTS OR APPLICATIONS
1,183,892   3/1970   Germany..................... 198/220 BC Primary Examiner—Edward A. Sroka
Attorney, Agent, or Firm—Hammond & Littell

[57] ABSTRACT

A novel vibratory conveyor comprising a conveyor bowl capable of periodic rotational and vertical vibrations, the bowl bottom being separate from its wall, the bowl wall supporting a helical conveyor track being connected by linkage springs to a counter vibrating mass supported on a fixed base plate, the bottom of the conveyor bowl being rotatably mounted on said base plate.

4 Claims, 1 Drawing Figure

PATENTED JAN 29 1974
3,788,449
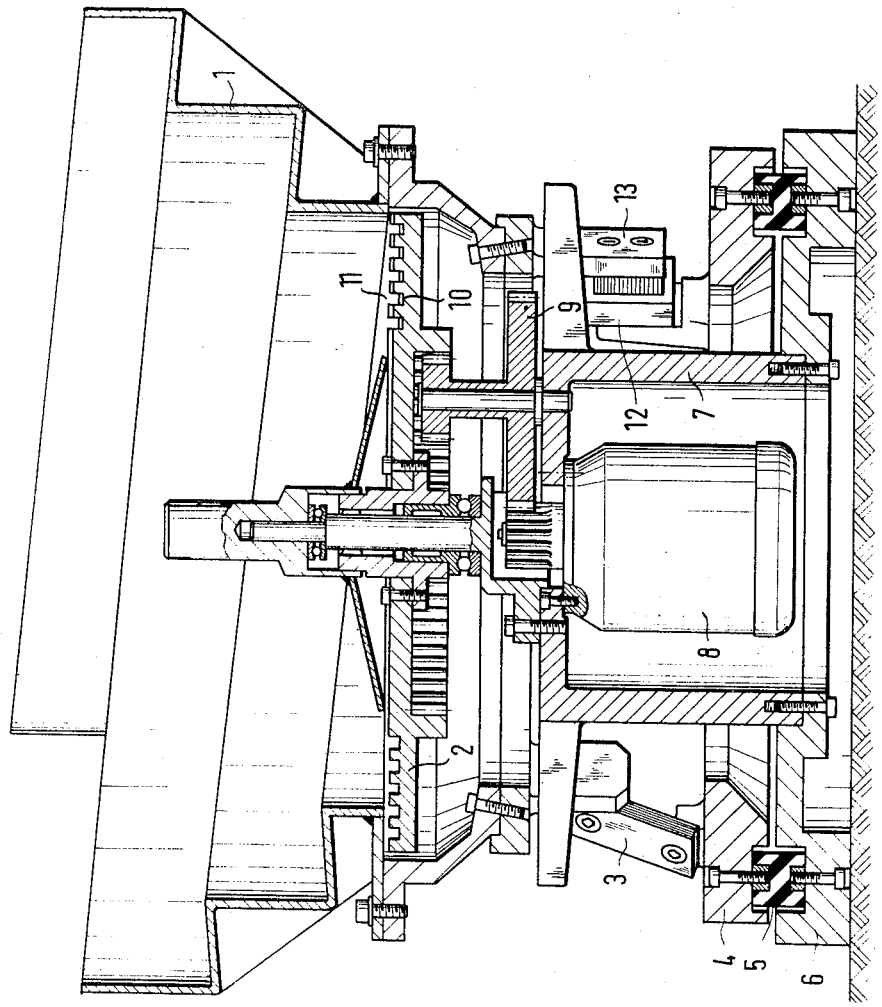

NOVEL VIBRATORY CONVEYOR

STATE OF THE ART

In one known vibratory conveyor, the bottom of the conveyor bowl is designed so that it is separated from its wall supporting the conveyor track and rotational and vertical vibrations are imparted only to the wall and thereby the conveyor track with an out-of-balance or an electromagnetic drive mechanism. See for example U.S. Pat. No. 3,473,759. The parts to be conveyed experience an upwardly directed thrust motion and travel upwards on the helical conveyor track. The conveyor bowl bottom, including the parts located thereon and to be conveyed, does not participate in these vibrations and this makes it possible to achieve great efficiency since the natural frequency of the vibrating bowl wall becomes independent of the mass of the supply reservoir of parts to be conveyed lying on the bowl bottom.

However, when it is intended to convey moist or tacky parts which adhere to the conveyor track, the conveying output of this known vibratory conveyor may prove to be inadequate. When moist or tacky parts are involved, the conveyor track must experience a greater vertical retardation than for dry parts because, it is necessary to overcome their adhesive force in addition to their mass force in order to lift moist or tacky parts off the conveyor track. For this reason, the parts lift off the conveyor track within one vibration period only at a later moment and at a slower velocity so that shorter thrust ranges and, hence, slower conveying rates originate.

These latter conditions could be improved by the selection of a greater angle of inclination of the linkage springs or a greater amplitude of vibration. However, the horizontal velocity of the conveyed parts decreases again with a greater angle of inclination of the linkage springs or the parts travel less smoothly so that their sorting by sorting devices provided at the conveyor track is made more difficult. An increase of the amplitude of vibrations is limited by the durability of the spring material used for the linkage springs.

OBJECTS OF THE INVENTION

It is an object of the invention to provide a novel vibrating conveyor particularly suitable for conveying moist or tacky parts without increasing the drive imput for the conveyor track which imput would be absorbed by the linkage springs.

It is another object of the invention to provide a vibratory conveyor having separated bottom and wall bowl parts and a separate drive mechanism for turning the bowl bottom in the conveying direction.

These and other objects and advantages of the invention will become obvious from the following detailed description.

THE INVENTION

The novel vibratory conveying apparatus of the invention is compound of a stationary base plate, a bowl having a bottom portion and a separated side wall provided with a helical conveyor track, drive means for imparting rotary and vertical counter vibration only to the said side wall, elastic guide springs on the said base plate supporting the side wall, the bowl bottom being rotatably mounted on the said base plate and drive means for turning the bowl bottom in the conveyor direction.

With a vibratory conveyor of the invention, considerably more parts are conveyed per unit of time using the normal angles of inclination of the linkage springs as well as the usual amplitudes of vibrations. Especially also when the parts are heavily greased or sticky. Due to the adhesive forces holding the parts to be conveyed on the conveyor bowl bottom, a thrust in the direction towards the conveyor track is imparted to the parts to be conveyed upon the rotation of the conveyor bowl bottom, which thrust pushes them upwardly onto the conveyor track. The thrust stemming from the driven conveyor bowl bottom propagates along the conveyor track in an upward direction to the optionally provided sorting devices or to the discharge end of the conveyor track.

One advantageous embodiment of the invention provides means for possible regulation of the speed of the conveyor bowl bottom. It may thereby be adapted to various types of parts to be conveyed so that an optimum conveying speed can be attained.

A hydraulic motor or an electric motor, especially an infinitely variable DC motor, may be used to drive the conveyor bowl bottom. As the speed of conventional electric motors is considerably higher than the desired speed of the conveyor bowl bottom, a speed reducer may be interposed between the electric motor and the conveyor bowl bottom, or a gear motor can be used.

To achieve a continuous transition of parts from the conveyor bowl bottom to the conveyor track, the conveyor bowl bottom in another embodiment of the invention is provided with concentric grooves engaged by a comb-like extension of the helical conveyor track with wedge-shaped teeth pointed in conveying direction.

Referring now to the drawing:

The FIGURE is a sectional view of one embodiment of the vibratory conveyor of the invention.

The vibratory conveyor consists of a conveyor bowl with wall 1 having the shape of a helical conveyor track and a bottom 2 separated from wall 1. The wall 1, by a plurality of linkage springs 3 spaced about its circumference, is connected to countervibrating mass 4 fastened to the fixed base plate 6 via vibrating metal blocks 5. The inner housing 7 on which the bottom 2 of the conveyor bowl is rotatably mounted is screwed to the base plate 6 and the electric motor 8 which drives the bottom 2 of the conveyor bowl through reducing gear 9 is enclosed inside the inner housing 7. Concentric grooves 10 are machined into the conveyor bowl bottom 2, which grooves cooperate with a comb shaped extension 11 of the conveyor track, whose teeth are wedge shaped and directed in conveying direction to assure that the transition from the conveyor bowl bottom to the conveyor track is continuous.

Instead of driving the conveyor bowl bottom with an electric motor of relatively high speed and a speed reducer, the conveyor bowl bottom may also be attached directly to the shaft of a drive motor provided it furnishes the desired number of revolutions. The drive mechanism for wall 1 of the conveyor bowl in the form of a conveyor track consists of several electromagnets 12 and correlated armatures 13 fastened to the countervibrating mass 4 and to the wall 1. But any other known drive mechanism for vibratory conveyors may also be used.

Various modifications of the vibratory conveyor of the invention may be made without departing from the spirit or scope thereof and it is to be understood that the invention is to be limited only as defined in the appended claims.

We claim:

1. A vibratory conveyor comprising a stationary base plate, a bowl having a bottom portion and a separate side wall provided with a helical conveyor track, drive means for imparting rotary and vertical counter vibration only to the said side wall, elastic guide springs on the said base plate supporting the side wall, the bowl bottom being rotatably mounted on the said base plate and drive means for turning the bowl bottom in the conveyor direction.

2. The conveyor of claim 1 wherein the rotary speed of the bowl bottom may be regulated.

3. The conveyor of claim 1 wherein the bowl bottom is provided with concentric grooves which cooperate with a comb-shaped extension of the helical conveyor track.

4. The conveyor of claim 3 wherein the comb teeth are wedge shaped in the conveying direction.

* * * * *